US012741214B2

(12) United States Patent
Cai et al.

(10) Patent No.: US 12,741,214 B2
(45) Date of Patent: Sep. 22, 2026

(54) METHOD FOR CONTROLLING GAME CHARACTER, STORAGE MEDIUM AND ELECTRONIC DEVICE

(71) Applicant: NETEASE (HANGZHOU) NETWORK CO., LTD., Hangzhou (CN)

(72) Inventors: Kang Cai, Hangzhou (CN); Yilin Yan, Hangzhou (CN); Zhongyi Liu, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 305 days.

(21) Appl. No.: 18/257,104

(22) PCT Filed: Jan. 25, 2022

(86) PCT No.: PCT/CN2022/073761
§ 371 (c)(1),
(2) Date: Jun. 13, 2023

(87) PCT Pub. No.: WO2022/161349
PCT Pub. Date: Aug. 4, 2022

(65) Prior Publication Data

US 2024/0100433 A1 Mar. 28, 2024

(30) Foreign Application Priority Data

Jan. 28, 2021 (CN) ......................... 202110120462.7

(51) Int. Cl.
*A63F 13/56* (2014.01)
*A63F 13/60* (2014.01)
(Continued)

(52) U.S. Cl.
CPC .............. *A63F 13/56* (2014.09); *A63F 13/60* (2014.09); *A63F 13/75* (2014.09); *A63F 13/80* (2014.09); *A63F 2300/638* (2013.01)

(58) Field of Classification Search
CPC .......... A63F 13/56; A63F 13/60; A63F 13/75; A63F 13/80; A63F 2300/638
See application file for complete search history.

(56) References Cited

U.S. PATENT DOCUMENTS 8,000,947 B1 8/2011 Qureshi et al.
2013/0116046 A1* 5/2013 Manton .................. A63F 13/00 463/31

(Continued)

FOREIGN PATENT DOCUMENTS

CN 105930079 A 9/2016
CN 107835148 A 3/2018

(Continued)

OTHER PUBLICATIONS

1st Office Action dated Nov. 16, 2023 of Chinese Application No. 202110120462.7.

(Continued)

*Primary Examiner* — Ankit B Doshi
(74) *Attorney, Agent, or Firm* — Qinghong Xu

(57) ABSTRACT

A method for controlling a game character, a storage medium and an electronic device are provided, the method for controlling a game character includes: executing, by a client, a preset game event in response to determining that a start instruction of the preset game event sent by a server is received, and locking a first type operation and a second type operation for the game character; unlocking, by the client, the first type operation, in response to determining that an unlocking moment of the first type operation in the preset game event is reached; unlocking, by the client, the second type operation, in response to determining that an (Continued)

unlocking instruction of the second type operation is received, wherein the unlocking instruction of the second type operation is sent by the server at an unlocking moment of the second type operation.

20 Claims, 4 Drawing Sheets

(51) Int. Cl.
*A63F 13/75* (2014.01)
*A63F 13/80* (2014.01)

(56) References Cited

U.S. PATENT DOCUMENTS

2014/0121008 A1* 5/2014 Canessa .................. A63F 13/95 463/29
2017/0282076 A1* 10/2017 Tsui ........................ A63F 13/35
2018/0093187 A1* 4/2018 Mabuchi ............... A63F 13/795
2018/0093188 A1* 4/2018 Mabuchi ................ A63F 13/60
2018/0214775 A1* 8/2018 Karashima .............. A63F 13/63
2019/0126150 A1* 5/2019 Tartaj .................... A63F 13/335
2020/0004932 A1* 1/2020 Eatedali .................. G06F 21/12
2020/0155930 A1* 5/2020 Wang .................. A63F 13/5378
2020/0206638 A1* 7/2020 Nakano ................. A63F 13/795
2020/0306649 A1* 10/2020 Aita ...................... A63F 13/798
2021/0086077 A1* 3/2021 Tartaj ...................... A63F 13/46
2021/0322865 A1* 10/2021 Shao ....................... A63F 13/42
2022/0088478 A1* 3/2022 Dicken ............... A63F 13/5372
2022/0387892 A1* 12/2022 Arnell ..................... A63F 13/69

FOREIGN PATENT DOCUMENTS

CN 108514739 A 9/2018
CN 110038297 A 7/2019
CN 110180190 A 8/2019
CN 110743166 A 2/2020
CN 111643904 A 9/2020
CN 111760287 A 10/2020
CN 111773675 A 10/2020
CN 112827173 A 5/2021
JP 2001347071 A 12/2001
JP 6298866 B1 3/2018
JP 2020096778 A 6/2020
WO 0078547 A1 12/2000

OTHER PUBLICATIONS

International Search Report dated Apr. 25, 2022 of International Application No. PCT/CN2022/073761.
Notice of Allowance dated May 24, 2024 of Chinese Application No. 202110120462.7.

* cited by examiner

METHOD FOR CONTROLLING GAME CHARACTER, STORAGE MEDIUM AND ELECTRONIC DEVICE

CROSS-REFERENCE TO RELATED APPLICATIONS

The present disclosure is a U.S. National Stage of International Application No. PCT/CN2022/073761, filed on Jan. 25, 2022, which is based upon claims priority to Chinese Patent Application No. 202110120462.7, filed on Jan. 28, 2021, entitled "GAME CHARACTER CONTROL METHOD AND APPARATUS, AND STORAGE MEDIUM AND ELECTRONIC DEVICE", the entire content of both of which are incorporated herein by reference for all purposes.

TECHNICAL FIELD

The present disclosure relates to a field of computer technology, and more particularly to a method for controlling a game character, an apparatus for controlling a game character, a computer-readable storage medium and an electronic device.

BACKGROUND

In MOBA (Multiplayer Online Battle Arena), action, shooting and other types of games, a hard-straight mechanism is usually provided, which means that a game character is in a hard-straight state for a period of time after performing a specific action (such as releasing a skill, launching a move), and that is, the game character cannot be operated. Most of the current hard-straight mechanisms have defects of causing a user a stiff operation experience.

It should be noted that information disclosed above is merely configured to enhance understanding of BACKGROUND of the present disclosure, which may include information that does not constitute a prior art known to those skilled in the related art.

SUMMARY

According to a first aspect of the present disclosure, a method for controlling a game character is provided and includes: executing, by a client, a preset game event in response to determining that a start instruction of the preset game event sent by a server is received, and locking a first type operation and a second type operation for the game character; unlocking, by the client, the first type operation in response to determining that an unlocking moment of the first type operation in the preset game event is reached; unlocking, by the client, the second type operation in response to determining that an unlocking instruction of the second type operation is received, where the unlocking instruction of the second type operation is sent by the server at an unlocking moment of the second type operation.

According to a second aspect of the present disclosure, a non-transitory computer-readable storage medium having a computer program stored thereon, where when executed by a processor, the computer program causes the processor to perform operations of: executing a preset game event in response to determining that a start instruction of the preset game event sent by a server is received, and locking a first type operation and a second type operation for the game character; unlocking the first type operation in response to determining that an unlocking moment of the first type operation in the preset game event is reached; unlocking the second type operation in response to determining that an unlocking instruction of the second type operation is received, where the unlocking instruction of the second type operation is sent by the server at an unlocking moment of the second type operation.

According to a third aspect of the present disclosure, an electronic device is provided and includes: a processor; and a memory configured for storing executable instructions of the processor; where the processor is configured to execute a preset game event in response to determining that a start instruction of the preset game event sent by a server is received, and lock a first type operation and a second type operation for the game character; unlock the first type operation in response to determining that an unlocking moment of the first type operation in the preset game event is reached; unlock the second type operation in response to determining that an unlocking instruction of the second type operation is received, where the unlocking instruction of the second type operation is sent by the server at an unlocking moment of the second type operation.

It should be understood that the above general description and the following detailed description are merely exemplary and explanatory, and should not limit the present disclosure.

BRIEF DESCRIPTION OF THE DRAWINGS

The drawings herein are incorporated into the specification and constitute a part of the specification, show embodiments that conform to the present disclosure, and are used together with the specification to explain the principles of the present disclosure. Obviously, the drawings in the following description are only some embodiments of the present disclosure. For those of ordinary skill in the art, without paying any creative work, other drawings can also be obtained based on these drawings.

DETAILED DESCRIPTION

Figure 1:
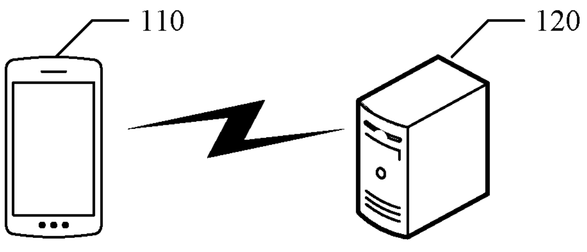
FIG. 1 shows a system architecture of an operation environment of the present embodiment.

Embodiments will now be described more fully with reference to the accompanying drawings. However, the embodiments can be implemented in various forms and should not be construed as limitation to the embodiments set forth herein. Instead, these embodiments are provided so that the disclosure will be thorough and complete; and will fully convey the concept of embodiments to those skilled in the art. The described features, structures, or characteristics may be combined in any suitable manner in one or more embodiments. In the following description, many specific details are provided to give a full understanding of the embodiments of the present disclosure. However, those skilled in the art will realize that the technical solutions of the present disclosure may be practiced without one or more of the specific details, or by using other methods, components, materials, devices, steps and the like. In other cases, well-known technical solutions are not shown or described in detail to avoid obscuring aspects of the present disclosure.

In addition, the drawings are merely schematic illustrations of the present disclosure and are not necessarily drawn to scale. The same reference numerals in the drawings identify the same or similar parts, and thus repeated descriptions thereof will be omitted. Some of the block diagrams shown in the drawings indicate functional entities and do not necessarily have to correspond to physically or logically independent entities. These functional entities may be implemented in the form of software, or implemented in one or more hardware modules or integrated circuits, or implemented in different networks and/or processor devices and/or microcontroller devices.

In the present disclosure, terms, such as "first", "second" and the like are merely marks for specific objects, which are not used to limit a number or an order of the object.

In the related art, the setting of a hard-straight mechanism mostly has the following defects:

A time point is set after a game character performs a specific action, the game character is not allowed to perform any operation before the time point, and after the time point, the game character is back to normal, which causes a user a very stiff operation experience and an abrupt change on a game screen. For example, the game character is in a hard-straight state in one second, and may move quickly in a next second, which is very incongruous.

In addition, after the game character performs a specific action, the set time point is completely triggered by a server and synchronized to the game client. Since there is a time delay during the synchronization, the synchronization may be affected by a network fluctuation, resulting in a game screen jamming and a poor game experience.

In view of the above one or more problems, embodiments of the present disclosure provide a method for controlling a game character. FIG. 1 shows a system architecture of an operation environment of the method, which includes a game client 110 and a server 120. The game client 110 may be a terminal device such as a mobile phone, tablet, and the like, to execute the method for controlling the game character, and the server 120 may be a computer or a server in a game background, to receive a request from the client or send an instruction to the client.

It should be understood that a number of apparatuses in FIG. 1 is only exemplary, and there may be any number of game clients 110 and server 120 according to an implementation requirement.

Figure 2:
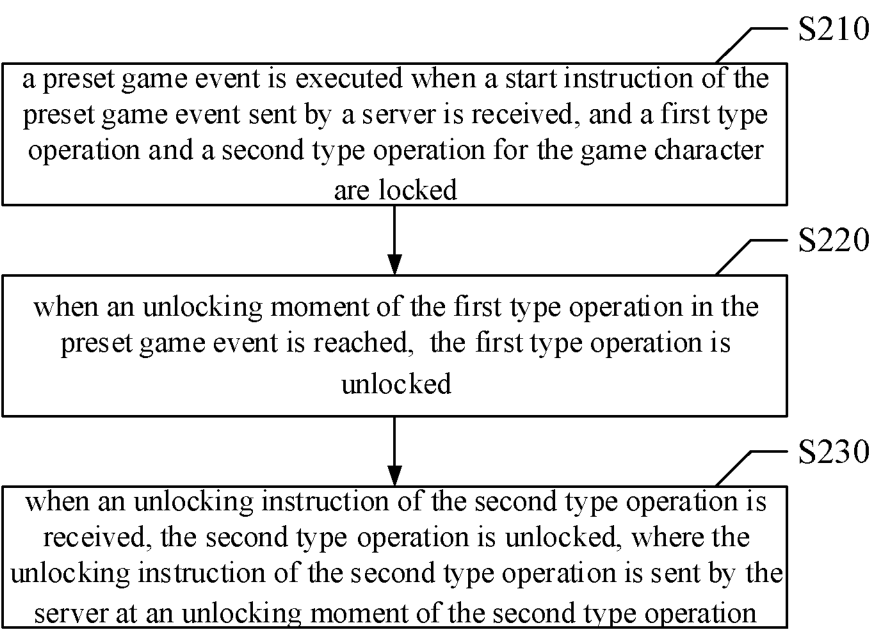
FIG. 2 shows a flowchart of a method for controlling a game character in the present embodiment.

FIG. 2 shows a schematic flow of a method for controlling a game character in the embodiment, which may be performed by the above game client 110, the method includes the following steps S210 to S230:

- step S210, a preset game event is executed when a start instruction of the preset game event sent by a server is received, and a first type operation and a second type operation for the game character are locked;
- step S220, when an unlocking moment of the first type operation in the preset game event is reached, the first type operation is unlocked;
- step S230, when an unlocking instruction of the second type operation is received, the second type operation is unlocked, where the unlocking instruction of the second type operation is sent by the server at an unlocking moment of the second type operation.

When the start instruction of the preset game event sent by the server is received, the preset game event starts to be executed, and the first type operation and the second type operation for the game character are locked; when an unlocking moment of the first type operation in the preset game event is reached, the first type operation is unlocked; when an unlocking instruction of the second type operation is received, the second type operation is unlocked, where the unlocking instruction of the second type operation is sent by the server at an unlocking moment of the second type operation. On the one hand, the unlocking moment of the first type operation is triggered by the game client, which may avoid problems of the time delay and the network fluctuation in the process of triggering the unlocking moment of the first type operation by the server and synchronizing to the game client. Based on characteristics that a frame rate of the game client is usually higher than a frame rate of the server, triggering the unlocking moment of the first type operation by the game client may improve the smoothness of the game screen of the client. On the other hand, by unlocking all kinds of operations step by step, the user's game operation experience is improved and the abrupt change on the game screen is avoided.

Each step in FIG. 2 is described in detail below.

Step S210, a preset game event is executed when a start instruction of the preset game event sent by a server is received, and a first type operation and a second type operation for the game character are locked.

The preset game event refers to an event that is preset in the game and triggered under control of the server, and may cause the game character to be in a hard-straight state. When the server reaches a start execution moment of the preset game event, the server sends the start instruction of the preset game event to the game client. The execution process of the preset game event may be displayed through the game animation played by the game client.

That the first type operation and the second type operation of the game character are locked refers to that the game client does not respond to the first type operation and the second type operation that control the game character, and the user cannot control the game character through a control of the first type operation and a control of the second type operation in a game interface. The game character is in the hard-straight state. It should be noted that in a game design, when a certain type of a game event is triggered, control operation of the game character may be locked for a period of time, and in this case, the operation control of the game character cannot be performed. This state of the game character is called the hard-straight state.

Figure 3:
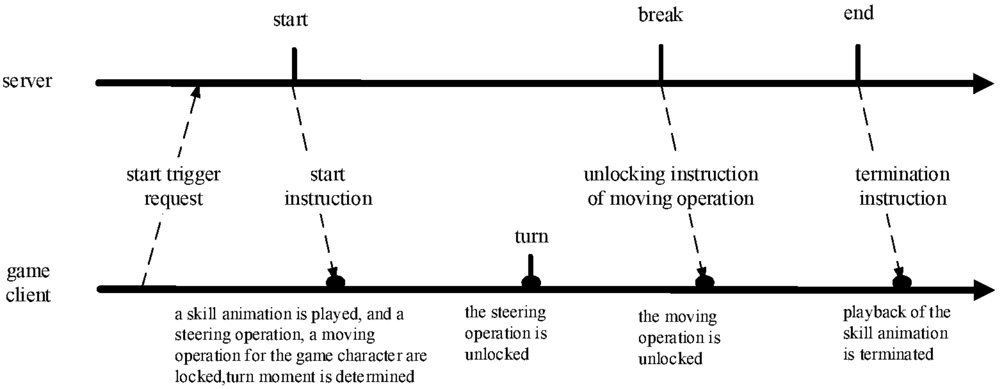
FIG. 3 shows an example diagram of controlling a game character to release a skill in the present embodiment.

As an example diagram of controlling a game character to release a skill shown in FIG. 3, when the server reaches a start moment (start) of the game character releasing the skill, the server sends the game client the start instruction of the game character releasing the skill. When the game client receives the start instruction of the game character releasing the skill, a skill animation starts to be played, and a steering operation and a moving operation for the game character are locked.

In this embodiment, two or more hard-straight states may be set for the game character, and operations allowed in different hard-straight states are different. Thus, the operations for the game character may be divided into the first type operation and the second type operation, corresponding to different hard-straight states respectively. The first type operation is an operation whose the unlocking moment is determined by the client, and the second type operation is an operation whose unlocking moment is determined by the server.

In an embodiment, the first type operation may include any one or a plurality of the following: a steering operation, a limb control operation, and a defensive operation.

The steering operation may be an in-situ steering or a continuous steering operation of the game character, and the steering operation of the game character may be controlled through a virtual remote sensing control in the game interface. The limb control operation may be an operation of the game character, such as jumping, squatting, turning a head and the like in situ. The limb operation of the game character may be controlled by a limb-controlled control in the game interface. The defensive operation may be a physical defensive operation such as the game character holding a shield in situ and the like. The setting of the first type operation avoids the problem that the game character is in a hard-straight state and cannot perform any operation, which is used to improve the user's operation experience.

In an embodiment, the second type operation may include any one or a plurality of the following: a skill release operation, a moving operation, an operation of using a prop.

The skill release operation, such as vertigo, imprisonment, freezing and other skills, may be released through a skill release control in the game interface. The moving operation, such as front, rear, left and right movement, may control movement of the game character through the virtual remote sensing control in the game interface. The operation of using a prop, such as sprint, blood return, stealth and other props, may control the use of the prop through a prop control in the game interface.

In an embodiment, the first type operation and the second type operation may be divided from a perspective of the fairness of a game character battle. An operation that has less impact on the fairness of the game character battle may be regarded as a first type operation, and an operation that has greater impact on the fairness of the game character battle may be regarded as a second type operation. For example, when the game character is in the hard-straight state, the unlocking moment of the steering operation is triggered in advance by a cheating script, which has little impact on the fairness of the game character battle, thus the unlocking moment of the steering operation may be triggered by the game client, and the steering operation may be regarded as the first type operation; the unlocking moment of the moving operation is triggered in advance through a cheating script, which has a great impact on the fairness of the game character battle, thus the unlocking moment of the moving operation needs to be triggered by the server to avoid cheating of the game client, and the moving operation may be regarded as the second type operation.

In an embodiment, the first type operation and the second type operation may also be divided according to the logic of the game itself. For example, when the game character is attacked, a defensive operation is regarded as a first type operation and an attack operation is regarded as a second type operation.

It should be noted that a specific division of the first type operation and the second type operation may be set according to a specific game scenario.

In an embodiment, the first type operation may be subdivided into a plurality of subtypes, such as 1-1 subtype operation and 1-2 subtype operation. The unlocking moment of the first type operation may include a plurality of unlocking moments, which are respectively regarded as an unlocking moment of each subtype operation in the first type operation. The second type operation may also be subdivided into a plurality of subtypes, such as 2-1 subtype operation and 2-2 subtype operation. The unlocking moment of the second type operation may further include a plurality of unlocking moments, which are respectively regarded as an unlocking moment of each subtype operation in the second type operation.

The further subdivision of the first type operation and the second type operation in the above process may optimize the rationality of the game logic and further enhance the user's game operation experience.

In an embodiment, the preset game event may include: the game character releasing a skill, the game character being attacked, or the game character triggering a preset plot.

When the start instruction of the game character releasing the skill sent by the server is received, the game client starts to play the skill animation of the game character. When the start instruction of the game character being attacked sent by the server is received, the game client starts to play an animation of the game character being attacked. When the start instruction of the game character triggering the preset plot sent by the server is received, the game client starts to play a corresponding animation of the preset plot. It should be noted that the execution of the above preset game event needs to last for a period of time.

In an embodiment, before the start instruction of the preset game event sent by the server is received, it further includes sending a start trigger request to the server in response to a start trigger operation of the preset game event.

The start trigger operation is a trigger operation to start executing the preset game event detected by the game client, and the start trigger request is a request to start executing the preset game event. When the preset game event is the game character releasing the skill, first, the user clicks a skill release control on the game client, and when the game client detects the user's operation of releasing the skill, the game client may send the start trigger request to the server in response to the start trigger operation of the game character releasing the skill, as shown in FIG. 3. The start trigger request is sent to the server such that the preset game event, which is triggered by the server, starts to be executed, to prevent the game client from cheating and affecting the fairness of the game.

step S220, when an unlocking moment of the first type operation in the preset game event is reached, the first type operation is unlocked.

The unlocking moment of the first type operation is determined by the game client. The first type operation is unlocked, and that is, the game character is controlled to perform the first type operation by using the control of the first type operation.

As shown in FIG. 3, the game client determines the unlocking moment (turn) of the steering operation. When the unlocking moment (turn) of the steering operation in the game character releasing the skill is reached, the steering operation is unlocked. After that, the game client may accept the user's steering operation on the game character. It should be noted that in a scenario shown in FIG. 3, when the user's steering operation is received, whether a game skill animation follows the game character to turn relates to whether the game character and the skill animation are bound. When the game character and the skill animation are bound, the game skill animation follows the game character to turn. When the game character and the skill animation are not bound, a position of the game skill animation is fixed and the game skill animation does not follow the game character to turn.

In an embodiment, the unlocking moment of the first type operation may be determined by a following manner: the unlocking moment of the first type operation may be determined according to a moment of receiving the start instruction and a preset locking duration of the first type operation.

The preset locking duration of the first type operation refers to a pre-set duration for locking the first type operation. A moment of receiving the start instruction after the preset locking duration of the first type operation may be regarded as the unlocking moment of the first type operation. The unlocking moment of the first type operation is determined by the game client, which is not only simple and easy to implement, but also may avoid problems of the time delay and the network fluctuation in the process of triggering the unlocking moment of the first type operation by the server and synchronizing to the game client. Based on characteristics that a frame rate of the game client is usually higher than a frame rate of the server, the unlocking moment of the first type operation triggered by the game client may improve the performance of the game screen of the client.

step S230, when an unlocking instruction of the second type operation is received, the second type operation is unlocked, where the unlocking instruction of the second type operation is sent by the server at an unlocking moment of the second type operation.

The server may determine the unlocking moment of the second type operation, and the unlocking instruction of the second type operation is sent to the game client at the unlocking moment of the second type operation. The game client releases the lock on the second type operation, and that is, the game character may be controlled to perform the second type operation by using the control of the second type operation.

As shown in FIG. 3, when the server reaches the unlocking moment (break) of the moving operation, the server sends the unlocking instruction of the moving operation to the game client. When the game client receives the unlocking instruction of the moving operation, the moving operation is unlocked.

In an embodiment, the method for controlling the game character may further include the following step: when a termination instruction of the preset game event sent by the server is received, execution of the preset game event is terminated.

The server may determine a termination moment of the preset game event, and send the termination instruction of the preset game event to the game client at the termination moment of the preset game event. When the termination instruction of the preset game event sent by the server is received, the execution of the preset game event is terminated. The game client terminates the execution of the preset game event according to the termination instruction of the server to prevent the game client from cheating and affecting the fairness of the game. As shown in FIG. 3, when the server reaches the termination moment (end) of the game character releasing the skill, the server sends the termination instruction of the game character releasing the skill to the game client. When the game client receives the termination instruction of the game character releasing the skill, playback of the skill animation is terminated.

In an embodiment, before the termination instruction of the preset game event sent by the server is received, the method for controlling the game character may further include sending a termination trigger request to the server in response to a termination trigger operation of the preset game event.

The termination trigger operation is a trigger operation to terminate the preset game event detected by the game client, and the termination trigger request is a request to terminate the execution of the preset game event. For example, in a case that the user needs to long-press a skill control to maintain a release of the skill, when the user presses and holds the skill release control in the game interface, the skill release operation starts to be performed. When the user releases the control, the game client detects the trigger operation to stop releasing the skill, and needs to send the trigger request to stop releasing the skill to the server. The termination of the execution of the preset game event is triggered by the server, so as to prevent the game client from cheating and affecting the fairness of the game.

Figure 4:
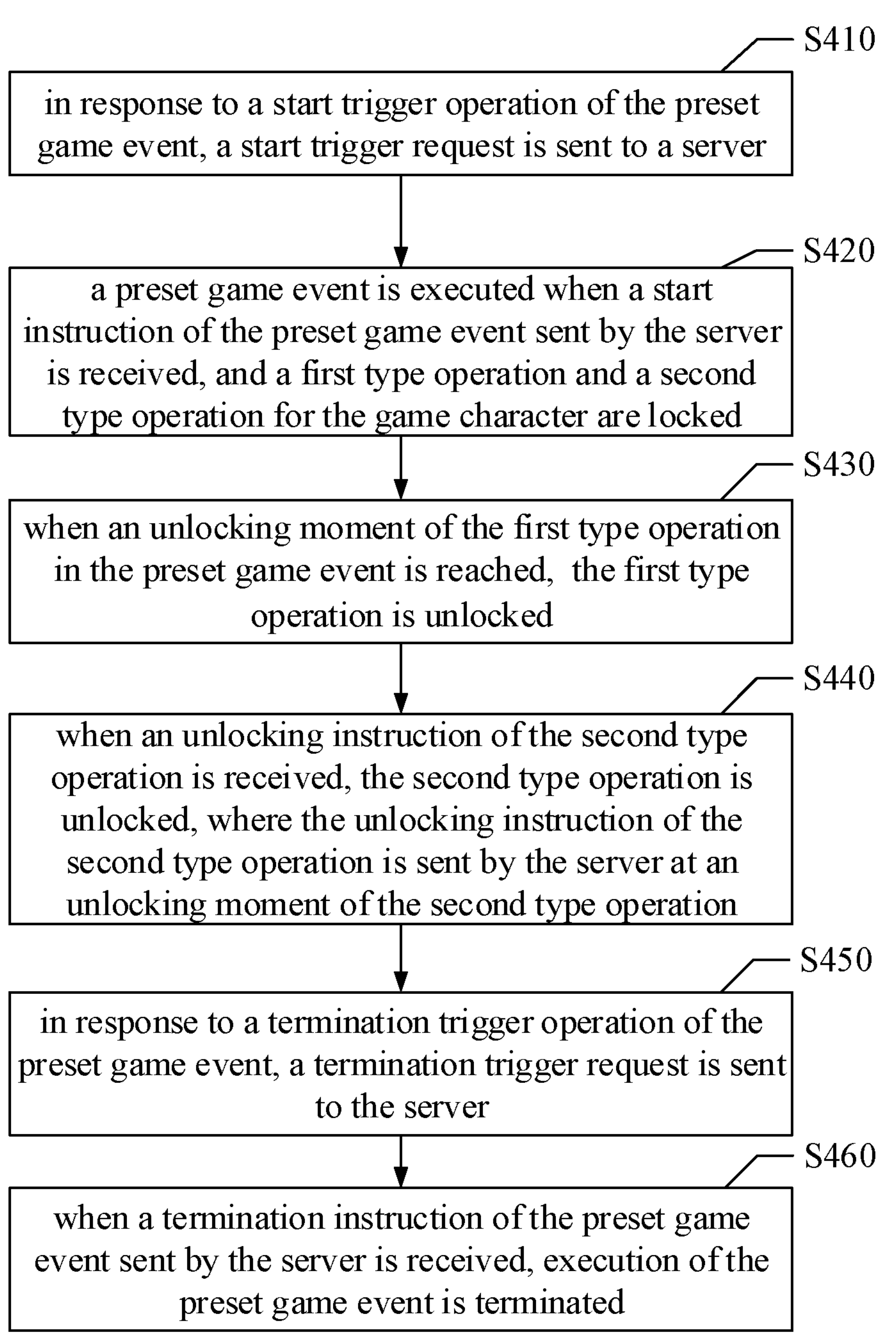
FIG. 4 shows a flowchart for implementing a game character control in the present embodiment.

Next, a specific implementation flowchart of a game character control is provided, as shown in FIG. 4, which includes the following steps:

S410, in response to a start trigger operation of the preset game event, a start trigger request is sent to a server;

S420, a preset game event is executed when a start instruction of the preset game event sent by the server is received, and a first type operation and a second type operation for the game character are locked;

S430, when an unlocking moment of the first type operation in the preset game event is reached, the first type operation is unlocked;

S440, when an unlocking instruction of the second type operation is received, the second type operation is unlocked, where the unlocking instruction of the second type operation is sent by the server at an unlocking moment of the second type operation;

S450, in response to a termination trigger operation of the preset game event, a termination trigger request is sent to the server;

S460, when a termination instruction of the preset game event sent by the server is received, execution of the preset game event is terminated.

Figure 5:
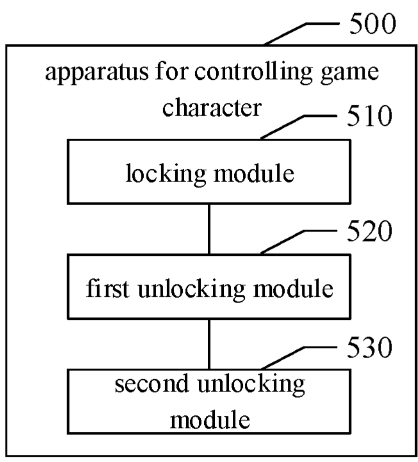
FIG. 5 shows a structure block diagram of a game character control in the present embodiment.

The embodiment of the present disclosure also provides an apparatus for controlling a game character. As shown in FIG. 5, the apparatus for controlling the game character 500 may include:

a locking module 510, configured to execute a preset game event when a start instruction of the preset game event sent by a server is received, and lock a first type operation and a second type operation for the game character;

a first unlocking module 520, configured to unlock the first type operation when an unlocking moment of the first type operation in the preset game event is reached;

a second unlocking module 530, configured to unlock the second type operation when an unlocking instruction of the second type operation is received, where the unlocking instruction of the second type operation is sent by the server at an unlocking moment of the second type operation.

In an embodiment, the apparatus for controlling the game character 500 further includes a determination module of the unlocking moment of the first type operation, which is configured to determine the unlocking moment of the first type operation according to a moment of receiving the start instruction and a preset locking duration of the first type operation.

In an embodiment, before the start instruction of the preset game event sent by the server is received, the apparatus for controlling the game character 500 further includes: a start trigger request response module, configured to send a start trigger request to the server in response to a start trigger operation of the preset game event.

In an embodiment, the apparatus for controlling the game character 500 further includes: a termination execution module, configured to terminate execution of the preset game event when a termination instruction of the preset game event sent by the server is received.

In an embodiment, the termination execution module is further configured to send a termination trigger request to the server in response to a termination trigger operation of the preset game event.

In an embodiment, the preset game event in the apparatus for controlling the game character 500 may include: the game character releasing a skill, the game character being attacked, or the game character triggering a preset plot.

In an embodiment, the first type operation in the apparatus for controlling the game character 500 may include at least one of the following: a steering operation, a limb control operation, or a defensive operation.

In an embodiment, the second type operation in the apparatus for controlling the game character 500 may include at least one of the following: a skill release operation, a moving operation, an operation of using a prop.

The specific details of each component in the above apparatus for controlling the game character 500 have been described in detail in the embodiments of the method part. For the details of the undisclosed solution, reference can be made to the content of the embodiments of the method part, which will not be repeated herein.

An embodiment of the present disclosure also provides a computer-readable storage medium having stored thereon a program product capable of implementing the above method for controlling the game character of the present disclosure. In some possible implementations, aspects of the present disclosure may also be implemented in the form of a program product, which includes program codes. When the program product is run on an electronic device, the program codes are used to cause the electronic device to perform the steps according to various embodiments of the present disclosure described in the above-mentioned methods. The program product may use a portable compact disc read-only memory (CD-ROM) and include program codes, and may be executed on an electronic device, such as a personal computer. However, the program product of the present disclosure is not limited thereto. The readable storage medium may be any tangible medium containing or storing a program, and the program may be used by an instruction execution system, apparatus, or device, or the program may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited. to wireless, wired, optical fiber, RF, etc., or any suitable combination of the foregoing.

The program codes for performing the operations of the present disclosure can be written in any combination of one or more programming languages, which include object-oriented programming languages, such as Java, C++, and so on. The programming languages also include conventional procedural programming language, such as "C" or a similar programming language. The program codes can be executed entirely on the user computing device, can be executed partly on the user device, can be executed as an independent software package, can be executed partly on the user computing device and partly on a remote computing device, or can be executed entirely on the remote computing device or server. In the case of a remote computing device, the remote computing device can be connected to the user computing device through any kind of network, including a local area network (LAN) or a wide area network (WAN), or the remote computing device can be connected to an external computing device, for example, by the Internet provided by the Internet service providers.

The embodiments of the present disclosure also provide an electronic device capable of implementing the above method for controlling the game character. The electronic device 600 according to this embodiment of the present disclosure is described below with reference to FIG. 6. The electronic device 600 shown in FIG. 6 is merely an example, and should not impose any limitation on the function and scope of use of the embodiments of the present disclosure.

Figure 6:
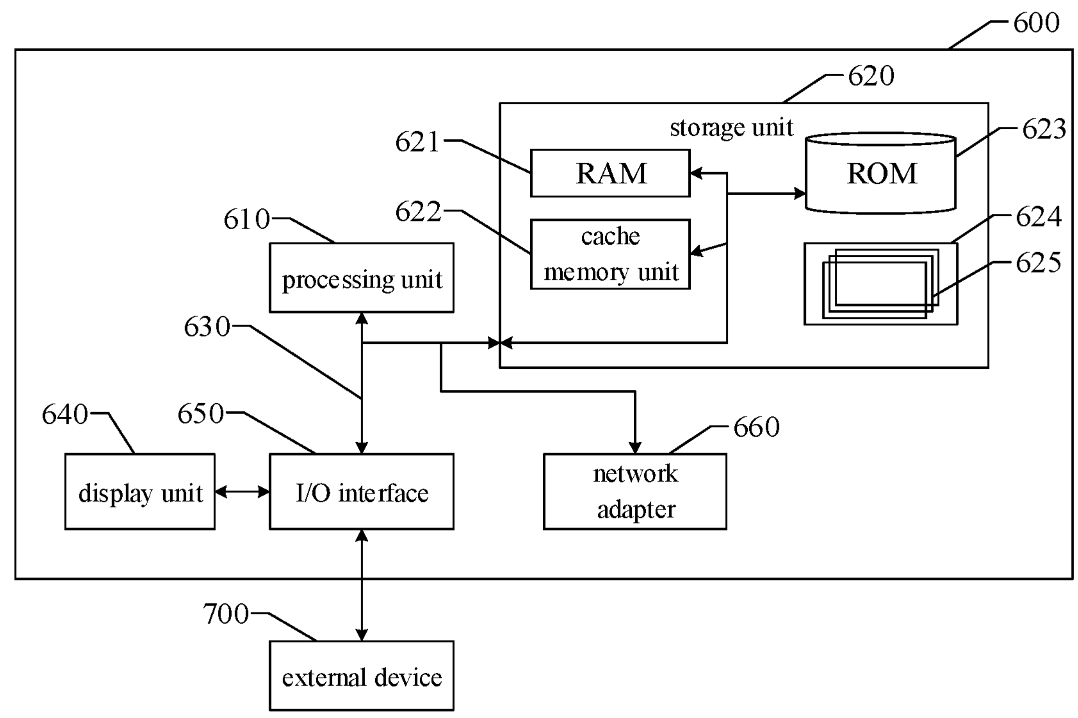
FIG. 6 shows an electronic device for implementing the above method in the present embodiment.

As shown in FIG. 6, the electronic device may be represented in the form of a general-purpose computing device. Components of the electronic device 600 may include, but is not limited to, at least one processing unit 610 described above, at least one storage unit 620 described above, a bus 630 connecting different system components (including the storage unit 620 and the processing unit 610), and a display unit 640.

The storage unit stores a program code, and the program code may be executed by the processing unit 610 so that the processing unit 610 executes the steps in various embodiments according to the present disclosure described in the above-mentioned "method" section of this specification. For example, the processing unit 610 may perform any one or a plurality of method steps in FIGS. 2 and 4.

The memory unit 620 may include a readable medium in the form of a volatile memory unit, such as at least one of a random access memory unit (RAM) 621 and a cache memory unit 622, and may further include a read only memory unit (ROM) 623.

The storage unit 620 may also include a program/utility 624 having a set (at least one) of program modules 625, such program modules 625 including but not limited to: an operating system, one or more application programs, other program modules, and program data. Each or some combination of these examples may include the implementation of a network environment.

The bus 630 may represent one or more of several types of bus structures, including a memory cell bus or a memory cell controller, a peripheral bus, an accelerated graphics port, a processing unit, or a local bus using any of a variety of bus structures.

The electronic device 600 may also communicate with one or more external devices 700 (e.g., a keyboard, a pointing device, a Bluetooth device, etc.), and may also communicate with one or more devices that enable the user to interact with the electronic device 600, or may communicate with any device (e.g., a router, a modem, etc.) that enables the electronic device 600 to communicate with one or more other computing devices. This communication may be performed via an input/output (I/O) interface 650. Also, the electronic device 600 may also communicate with one or more networks (e.g., at least one of a local area network (LAN), a wide area network (WAN), or a public network, such as the Internet) through a network adapter 660. As shown in the drawings, the network adapter 660 communicates with other modules of the electronic device 600 via the bus 630. It should be understood that although not shown in the drawings, at least one of other hardware and software modules may be used in conjunction with the electronic device 600, including but not limited to: a microcode, a device driver, a redundant processing unit, an external disk drive array, a RAID systems, a tape drive, and a data backup storage system.

Through the foregoing description of the embodiments, those skilled in the art can easily understand that the embodiments described herein may be implemented by software, and may also be implemented by software in combination with necessary hardware. Therefore, the technical solution according to the embodiments of the present disclosure may be embodied in the form of a software product that may be stored in a non-volatile storage medium (which may be a CD-ROM, a U disk, a mobile hard disk, etc.) or on a network, including several instructions to make a computing device (which may be a personal computer, a server, a terminal device, or a network device, etc.) perform the method according to the embodiments of the present disclosure.

In addition, the drawings are merely schematic descriptions of processes included in the methods according to embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in multiple modules, for example.

It should be noted that although several modules or units of the device for action execution are described above in detail, such division is not mandatory. In fact, according to embodiments of the present disclosure, the features and functions of two or more modules or units described above may be embodied in one module or unit. Conversely, the features and functions of one module or unit described above can be further divided into multiple modules or units According to a first aspect of the present disclosure, a method for controlling a game character is provided and includes: executing a preset game event when a start instruction of the preset game event sent by a server is received, and locking a first type operation and a second type operation for the game character; when an unlocking moment of the first type operation in the preset game event is reached, unlocking the first type operation; when an unlocking instruction of the second type operation is received, unlocking the second type operation, where the unlocking instruction of the second type operation is sent by the server at an unlocking moment of the second type operation.

In an embodiment of the present disclosure, the method further includes: determining, according to a moment of receiving the start instruction and a preset locking duration of the first type operation, the unlocking moment of the first type operation.

In an embodiment of the present disclosure, before the start instruction of the preset game event sent by the server is received, the method further includes: in response to a start trigger operation of the preset game event, sending a start trigger request to the server.

In an embodiment of the present disclosure, the method further includes: when a termination instruction of the preset game event sent by the server is received, terminating execution of the preset game event.

In an embodiment of the present disclosure, before the termination instruction of the preset game event sent by the server is received, the method further includes: in response to a termination trigger operation of the preset game event, sending a termination trigger request to the server.

In an embodiment of the present disclosure, the preset game event includes: the game character releasing a skill, the game character being attacked, or the game character triggering a preset plot.

In an embodiment of the present disclosure, the first type operation includes at least one of the following: a steering operation, a limb control operation, or a defensive operation.

In an embodiment of the present disclosure, the second type operation includes at least one of the following: a skill release operation, a moving operation, an operation of using a prop.

According to a second aspect of the present disclosure, an apparatus for controlling a game character is provided and includes: a locking module, configured to execute a preset game event when a start instruction of the preset game event sent by a server is received, and lock a first type operation and a second type operation for the game character; a first unlocking module, configured to unlock the first type operation when an unlocking moment of the first type operation in the preset game event is reached; a second unlocking module, configured to unlock the second type operation when an unlocking instruction of the second type operation is received, where the unlocking instruction of the second type operation is sent by the server at an unlocking moment of the second type operation.

According to a third aspect of the present disclosure, a computer-readable storage medium having a computer program stored thereon, where when executed by a processor, the computer program implements the above method for controlling the game character.

According to a fourth aspect of the present disclosure, an electronic device is provided and includes: a processor; and a memory configured for storing executable instructions of the processor; where the processor is configured to execute the above method for controlling the game character by executing the executable instructions.

Those skilled in the art may understand that, various aspects of the present disclosure may be implemented as a system, a method or a program product. Therefore, various aspects of the present disclosure may be embodied as a pure hardware, a pure software (including firmware, microcode, etc.), or a combination of hardware and software, which may be collectively referred to herein as circuit, module or system. Those skilled in the art will readily contemplate other embodiments of the present disclosure after considering the specification and practicing the present disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

It should be understood that the present disclosure is not limited to the precise structure that has been described above and shown in the drawings, and various modifications and changes may be made without departing from the scope thereof. The scope of the present disclosure is limited only by the appended claims.

What is claimed is:

1. A method for controlling a game character, comprising:

executing, by a client, a preset game event in response to determining that a start instruction of the preset game event sent by a server is received, and locking a first type operation and a second type operation for the game character to cause the game character to enter a hard-straight state; wherein the first type operation is an operation in which a first unlocking moment is determined by a client, and the second type operation is an operation in which a second unlocking moment is determined by the server; wherein a frame rate of the client is higher than a frame rate of the server, and the first unlocking moment determined by the client reduces display stutter caused by network latency;

unlocking, by the client, the first type operation in response to determining that the first unlocking moment of the first type operation in the preset game event is reached;

unlocking, by the client, the second type operation in response to determining that an unlocking instruction of the second type operation is received, wherein the unlocking instruction of the second type operation is sent by the server at the second unlocking moment of the second type operation.

2. The method according to claim 1, further comprising:

determining, according to a moment of receiving the start instruction and a preset locking duration of the first type operation, the first unlocking moment of the first type operation.

3. The method according to claim 1, further comprising:

sending a start trigger request to the server in response to a start trigger operation of the preset game event.

4. The method according to claim 1, further comprising:

terminating execution of the preset game event, in response to determining that a termination instruction of the preset game event sent by the server is received.

5. The method according to claim 4, further comprising:

sending a termination trigger request to the server in response to a termination trigger operation of the preset game event.

6. The method according to claim 1, wherein the preset game event comprises at least one of following events:

the game character releasing a skill, the game character being attacked, or the game character triggering a preset plot.

7. The method according to claim 1, wherein the first type operation comprises at least one of the following:

a steering operation, a limb control operation, or a defensive operation.

8. The method according to claim 1, wherein the second type operation comprises at least one of the following:

a skill release operation, a moving operation, or an operation of using a prop.

9. The method according to claim 1, wherein the unlocking moment of the first type operation is triggered by the client.

10. The method according to claim 1, wherein the locking the first type operation and the second type operation for the game character comprises:

the client not responding to the first type operation and the second type operation that control the game character.

11. The method according to claim 1, wherein the first type operation comprises a first operation with less impact on fairness of a game character battle; and the second type operation comprises a second operation with greater impact on the fairness of the game character battle.

12. The method according to claim 1, wherein when the game character is attacked, the first type operation is a defensive operation, and the second type operation is an attack operation.

13. The method according to claim 1, wherein the first type operation comprises a plurality of first subtype operations, the first unlocking moment of the first type operation comprises a plurality of first unlocking sub-moments, and the plurality of first unlocking sub-moments correspond to unlocking moments of the plurality of first subtype operations, respectively.

14. The method according to claim 1, wherein the second type operation comprises a plurality of second subtype operations, the second unlocking moment of the second type operation comprises a plurality of second unlocking sub-moments, and the plurality of second unlocking sub-moments correspond to unlocking moments of the plurality of second subtype operations, respectively.

15. A non-transitory computer-readable storage medium having a computer program stored thereon, wherein when executed by a processor, the computer program causes the processor to perform operations of:

executing a preset game event in response to determining that a start instruction of the preset game event sent by a server is received, and locking a first type operation and a second type operation for a game character to cause the game character to enter a hard-straight state; wherein the first type operation is an operation in which a first unlocking moment is determined by a client, and the second type operation is an operation in which a second unlocking moment is determined by the server; wherein a frame rate of the client is higher than a frame rate of the server, and the first unlocking moment determined by the client reduces display stutter caused by network latency;

unlocking the first type operation in response to determining that the first unlocking moment of the first type operation in the preset game event is reached;

unlocking the second type operation in response to determining that an unlocking instruction of the second type operation is received, wherein the unlocking instruction of the second type operation is sent by the server at the second unlocking moment of the second type operation.

16. An electronic device, comprising:

a processor; and a memory configured for storing executable instructions of the processor;

wherein the processor is configured to:

execute a preset game event in response to determining that a start instruction of the preset game event sent by a server is received, and lock a first type operation and a second type operation for a game character to cause the game character to enter a hard-straight state;

wherein the first type operation is an operation in which a first unlocking moment is determined by a client, and the second type operation is an operation in which a second unlocking moment is determined by the server;

wherein a frame rate of the client is higher than a frame rate of the server, and the first unlocking moment determined by the client reduces display stutter caused by network latency;

unlock the first type operation in response to determining that the first unlocking moment of the first type operation in the preset game event is reached;

unlock the second type operation in response to determining that an unlocking instruction of the second type operation is received, wherein the unlocking instruction of the second type operation is sent by the server at the second unlocking moment of the second type operation.

17. The electronic device according to claim 16, wherein the processor is further configured to:

determine, according to a moment of receiving the start instruction and a preset locking duration of the first type operation, the first unlocking moment of the first type operation.

18. The electronic device according to claim 16, wherein the processor is further configured to:

send a start trigger request to the server in response to a start trigger operation of the preset game event.

19. The electronic device according to claim 16, wherein the processor is further configured to:

terminate execution of the preset game event, in response to determining that a termination instruction of the preset game event sent by the server is received.

20. The electronic device according to claim 19, wherein the processor is further configured to:

send a termination trigger request to the server in response to a termination trigger operation of the preset game event.

* * * * *